United States Patent
Ravichandran

(10) Patent No.: US 7,178,066 B2
(45) Date of Patent: *Feb. 13, 2007

(54) APPARATUS AND METHOD FOR PROCESSOR PERFORMANCE MONITORING

(75) Inventor: Hari K. Ravichandran, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 830 days.

This patent is subject to a terminal disclaimer.

(21) Appl. No.: 10/056,224

(22) Filed: Jan. 22, 2002

(65) Prior Publication Data

US 2002/0162092 A1    Oct. 31, 2002

Related U.S. Application Data

(63) Continuation of application No. 08/947,368, filed on Oct. 8, 1997, now Pat. No. 6,341,357.

(51) Int. Cl.
    *G06F 11/00* (2006.01)

(52) U.S. Cl. .............................. 714/42; 714/38; 714/47

(58) Field of Classification Search .................. 714/38, 714/42, 718, 725, 730, 723, 47; 702/186
    See application file for complete search history.

(56) References Cited

U.S. PATENT DOCUMENTS

| | | | |
|---|---|---|---|
| 5,265,254 A | | 11/1993 | Blasciak et al. |
| 5,289,587 A | * | 2/1994 | Razban ........................ 703/28 |
| 5,564,015 A | * | 10/1996 | Bunnell ........................ 714/47 |
| 5,682,328 A | * | 10/1997 | Roeber et al. ............... 702/187 |
| 5,933,626 A | * | 8/1999 | Mahalingaiah et al. ...... 712/227 |
| 6,067,644 A | * | 5/2000 | Levine et al. .................. 714/47 |

OTHER PUBLICATIONS

Harden et al. "In Search of a Standards-Based Approach to Hybrid Performance Monitoring".
Rizvi et al. "Execution-Driven Simulation of a Superscalar Processor" (Proceedings of the $27^{th}$ Annual Hawaii International Conference on System Sciences, 1994; 1994 IEEE)_.
Yamamoto et al. Performance Estimation of Multistreamed, Superscalar Processors (Proceedings of the $27^{th}$ Annual Hawaii International Conference on System Sciences, 1994; 1994 IEEE).
Joseph G. Chamdari, Chapter 6 "Performance Analysis", from thesis entitled *Microarchitecture Techniques to Improve the Design of Superscalar Microprocessors* (Georgia Tech University, Mar. 1955).
Mink et al. "Multiprocessor Performance Measurement Instrumentation" (IEEE Computer, pp. 63-75, Sep. 1990).

* cited by examiner

*Primary Examiner*—Scott Baderman
*Assistant Examiner*—Tim Bonura
(74) *Attorney, Agent, or Firm*—Dorsey & Whitney LLP

(57) ABSTRACT

The technology of the present invention pertains to an apparatus and method for implementing a hardware-based performance monitoring mechanism for use in analyzing the behavior of a program module. The apparatus includes probe logic hardware that monitors the program's behavior in executing memory reference instructions. The probe logic hardware generates several probe signals which are transmitted to a performance monitor circuit when certain events occur. In an embodiment of the present invention, these events can be TLB or cache misses. The performance monitor circuit affixes a time stamp to the probe data and stores the time-stamped probe data in a temporary memory device until the data is stored in a magnetic storage device.

11 Claims, 4 Drawing Sheets

APPARATUS AND METHOD FOR PROCESSOR PERFORMANCE MONITORING

This is a continuation of application Ser. No. 08/947,368, filed Oct. 8, 1997 now U.S. Pat. No. 6,341,357.

BRIEF DESCRIPTION OF THE INVENTION

The present invention relates generally to systems and methods for program code development. More particularly, the invention relates to a hardware performance monitoring mechanism for the evaluation of a program module.

BACKGROUND OF THE INVENTION

Performance monitoring systems are often used to monitor the performance of the algorithms used in a program module and the supporting hardware. Performance monitoring techniques can be classified into three main categories: (1) hardware-based performance monitoring techniques; (2) software-based performance monitoring techniques; and (3) a hybrid technique utilizing a combination of software and hardware approaches.

Software-based performance monitoring techniques include software probes that write out information detailing the behavior of the program while the program is executing. A disadvantage to software performance monitoring is that it is intrusive to the program, often requiring substantial processor cycles and additional memory usage. Furthermore, the software probes cannot obtain detailed architectural performance measurements such as cache misses and the like.

The hybrid performance monitoring approach utilizes both hardware and software based techniques. In one such hybrid scheme, a probe data collection integrated circuit (chip) interfaces with a bus that is in communication with a number of processors. Program code running in each of the processors includes software probes that write event data to the probe data collection chip. The event data represents interprocess communications or events. The probe data collection chip affixes a time stamp to the data and stores the data for further analysis. A disadvantage with this technique is that it cannot obtain detailed architectural performance measurements.

Hardware performance monitoring techniques typically include probing physical signals with dedicated instrumentation and recording the results on external hardware. This approach is non-intrusive to the program code and can obtain detailed architectural performance measurements. However, there is no way of associating a hardware signal with a corresponding source code statement. This association is useful for making improvements to the program code.

Accordingly, there exists a need for a performance monitoring system that can overcome these shortcomings.

SUMMARY OF THE INVENTION

The technology of the present invention pertains to an apparatus and method for implementing a hardware performance monitoring mechanism for use in analyzing the behavior of a program module. The apparatus includes probe logic hardware that monitors the program's behavior in executing memory reference instructions. The probe logic hardware generates several probe signals which are transmitted to a performance monitor circuit when certain events occur. In an embodiment of the present invention, these events can be TLB or cache misses. The performance monitor circuit affixes a time stamp to the probe data and stores the time-stamped probe data in a temporary memory device until the data is stored in a secondary storage device.

A user can then analyze the probe data to determine a suitable manner for optimizing the program in order to improve its performance. The user will be able to associate a particular set of probe data with a particular program statement through the program counter. This will enable the user to optimize the program based on the architectural performance measurements.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
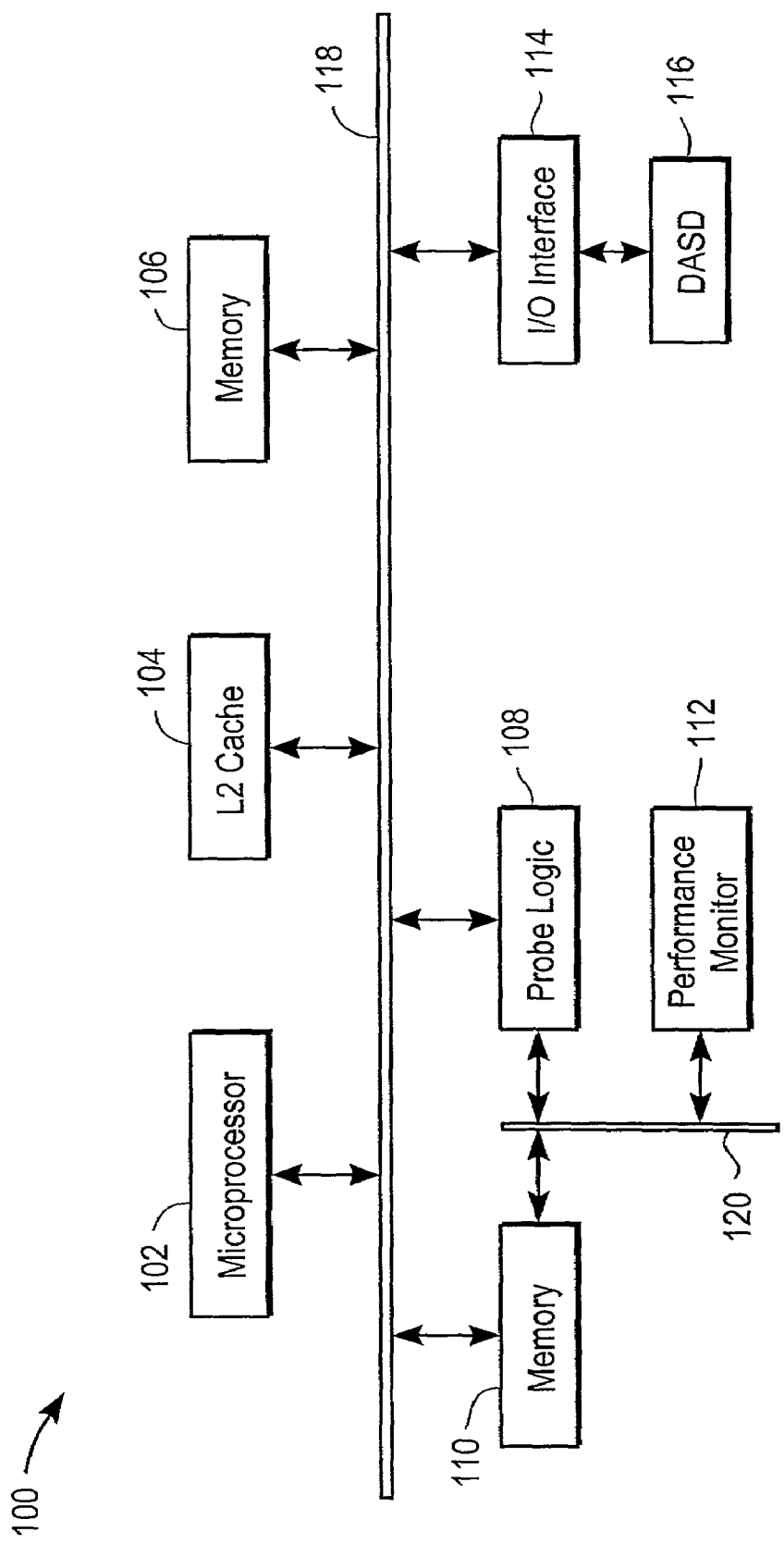
FIG. 1 illustrates an exemplary target computer system incorporating the technology of an embodiment of the present invention.

FIG. 1 illustrates a computer system 100 incorporating an embodiment of the technology of the present invention. The computer system 100 can be a workstation, personal computer, mainframe or any type of processing device. In an embodiment of the invention, the computer system 100 is a SPARC workstation manufactured by Sun Microsystems, Inc. The computer system 100 can include a microprocessor 102, a second level (L2) cache or high-speed memory 104, a first memory 106, a probe logic circuit 108, a second memory 110, and an I/O interface 114 all interconnected to a first bus 118. The I/O interface 114 is connected to a secondary memory device, such as a direct access storage device (DASD) or magnetic disk storage 116. The second memory 110, the probe logic circuit 108 and a performance monitor circuit 112 are interconnected to a second bus 120. The first memory 106 and the second memory 110 may be implemented as RAM (random access memory). Other system resources are available but not shown.

The probe logic circuit 108 receives signals from the microprocessor 102 and L2 cache 104 and processes them into probe data signals that are transmitted to the performance monitor circuit 112. The performance monitor circuit 112 affixes a time stamp signal to the probe data signals and the values of these signals are stored in the second memory 110. At certain time intervals, the probe data in the second memory 110 is then transferred to the DASD 116 through the I/O interface 114.

The performance monitor circuit 112 provides the capability of collecting probe data signals and associating a temporal identifier, such as a time stamp, to the probe data signals. In an embodiment of the present technology, the performance monitoring circuit 112 can be the MultiKron chip provided by the National Institute of Standards and Technology (NIST). However, it should be noted that this invention is not limited to this particular performance monitoring chip and that others can be used. A more detailed description of the MultiKron performance monitoring chip is found in Mink, et al., "MultiKron: Performance Measurement Instrumentation," Proc. IEEE International Computer Performance and Dependability Symposium, Urbana-Champaign, Ill., (September 1996), which is hereby incorporated by reference as background information.

Figure 2:
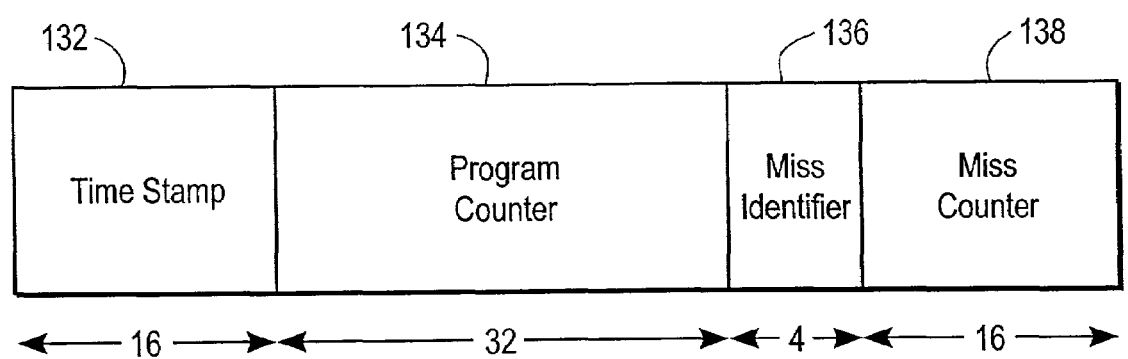
FIG. 2 illustrates a format for the probe signals in accordance with an embodiment of the present invention.

FIG. 2 illustrates the probe signals in an embodiment of the present invention. The performance monitor circuit 112 can receive three signals: (1) a first signal 134 indicating the value of a program counter (PC); (2) a second signal 136 indicating a device identifier; and (3) a third signal 138 representing the number of misses that the identified device has incurred thus far. The performance monitor circuit 112 associates a time stamp signal 132 with these signals and stores their values in the second memory 110. Preferably, the second memory 110 is used to store data from the performance monitor circuit 112 only. The time stamp signal 132 can be 16 bits wide, the program counter signal 134 can be 32 bits wide, the miss identifier signal 136 can be 4 bits wide, and the miss counter signal 138 can be 16 bits wide as shown in FIG. 2. The signals show in FIG. 2 are herein referred to as the probe data or probe data signals. A further discussion on the generation of these signals is described below.

In an embodiment of the present invention, the microprocessor 102, the L2 cache 104, the probe logic circuit 108, the performance monitor circuit 112, and second memory 110 can be distinct integrated circuits that reside on the same circuit board. In an alternate embodiment, the probe logic circuit 108 may also be incorporated into the microprocessor 102.

Figure 3:
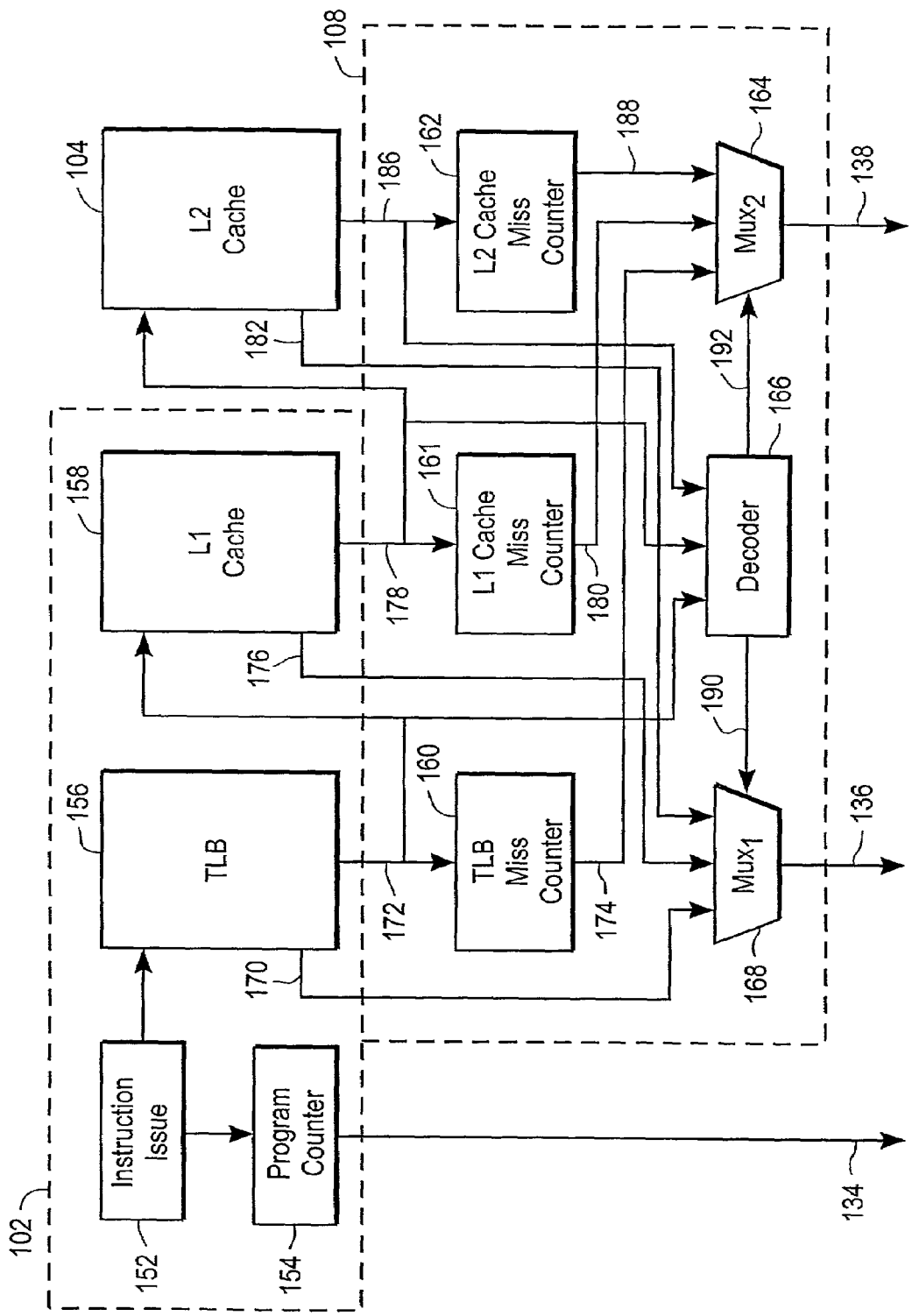
FIG. 3 is a more detailed representation of selected components of the apparatus of FIG. 1.

FIG. 3 illustrates some of the processing elements illustrated in FIG. 1 in an embodiment of the present technology. The microprocessor 102 can contain an instruction issue circuit 152, a program counter (PC) 154, a translation lookaside buffer (TLB) 156, a first level (L1) cache or high-speed memory 158, as well as other elements not shown. The microprocessor is in communication with a second level cache 104. The workings of an instruction issue circuit 152, the PC 154, the TLB 156, and the L1 cache 158 are well known in the art and as such are not described in detail herein.

The probe logic circuit 108 includes a TLB miss counter 160, a L1 miss cache counter 161, a L2 cache miss counter 162, a first multiplexer 168, a decoder 166, and a second multiplexer 164. The TLB miss counter 160 is coupled to the TLB 156 and incremented for each TLB miss that occurs. The TLB miss counter 160 generates a TLB miss count signal 174 that represents the value stored in the TLB miss counter 160. Likewise, the L1 cache miss counter 161 is coupled to the L1 cache 158 and contains an ongoing count of the number of misses from the L1 cache 158. The L1 cache miss counter 161 generates a L1 miss count signal 180 that represents the value stored in the L1 cache miss counter 161. The L2 cache miss counter 162 is coupled to the L2 cache 104 and is incremented for each L2 cache miss that occurs. The L2 miss counter 162 generates a L2 miss count signal 188 that represents the value stored in the L2 miss counter 162.

Upon a TLB miss, the TLB 156 generates a TLB identifier signal 170 and a TLB miss signal 172. The TLB miss signal 172 is transmitted to the TLB miss counter 160, to the L1 cache 158, and to the decoder 166. Preferably, the value of the TLB identifier signal is a 4-bit quantity that uniquely identifies the TLB 156. It can be obtained from a specially designated flip flops stored in the TLB 156.

Upon an L1 cache miss, the L1 cache 158 generates a L1 cache identifier signal 176 and a L1 cache miss signal 178. The L1 cache miss signal 178 is transmitted to the L1 cache miss counter 161, the L2 cache 104, and the decoder 166. Preferably, the value of the L1 cache miss signal 178 is a 4-bit quantity that uniquely identifies the L1 cache 158. It can be obtained from a specially designated flip flops stored in the L1 cache 158.

Upon an L2 cache miss, the L2 cache 104 generates a L2 cache identifier signal 182 and a L1 cache miss signal 186. The L2 cache miss signal 186 is transmitted to the L2 cache miss counter 162 and to the decoder 166. Preferably, the value of the L2 cache miss signal 186 is a 4-bit quantity that uniquely identifies the L2 cache 104. It can be obtained from a specially designated flip flops stored in the L2 cache 104.

A first multiplexer 168 is provided to select a particular device identifier signal when a miss in the device occurs. The first multiplexer 168 receives the identifier lines emitted from the TLB 156, the L1 cache 158, and the L2 cache 104. A decoder 166 is used to set the first multiplexer's select signal 190. That is, the decoder 166 receives each of the miss signals 172, 178, 186 and determines which of the miss signals is currently active and sets the first multiplexer select signal 190 to select the identifier signal corresponding to the active miss signal. The first multiplexer 168 generates a miss identifier signal 136 that identifies the device in which a miss has occurred.

A second multiplexer 164 is provided to generate a miss counter signal 138 that represents the number of misses that have occurred thus far in the device identified by the miss identifier signal 136. The second multiplexer 164 receives the miss count signals 174, 180, 188 from each of the counters. The decoder 166 is used to set the second multiplexer's select signal 192 and operates as described above with reference to the first multiplexer 168.

Preferably, the illustrated elements in FIG. 3 are used to execute memory reference instructions such as a load or store instruction. A load instruction loads data from one of the memory devices and a store instruction stores data into one of the memory devices. Typically, a memory reference instruction contains an instruction opcode and an address. The address stores information, albeit an instruction or data, associated with the instruction. The information in this address needs to be accessed in order to execute the instruction. Often, the address that is specified is a virtual address that requires translation to a physical address. The TLB 156 stores physical addresses associated with previously translated virtual addresses. The TLB 156 is searched for an entry associated with the virtual address. If the virtual address is not present in the TLB 156, main memory is accessed in order to perform the translation from the virtual address to the physical address.

Once the physical address is obtained, the contents of the address are accessed. There are several memory devices arranged in a hierarchical order. The memory hierarchy can include a L1 cache 158 that is accessed first, a L2 cache 104 that is accessed second, the RAM memory device 106 that is accessed third, and lastly a disk storage system (not shown).

Figure 4:
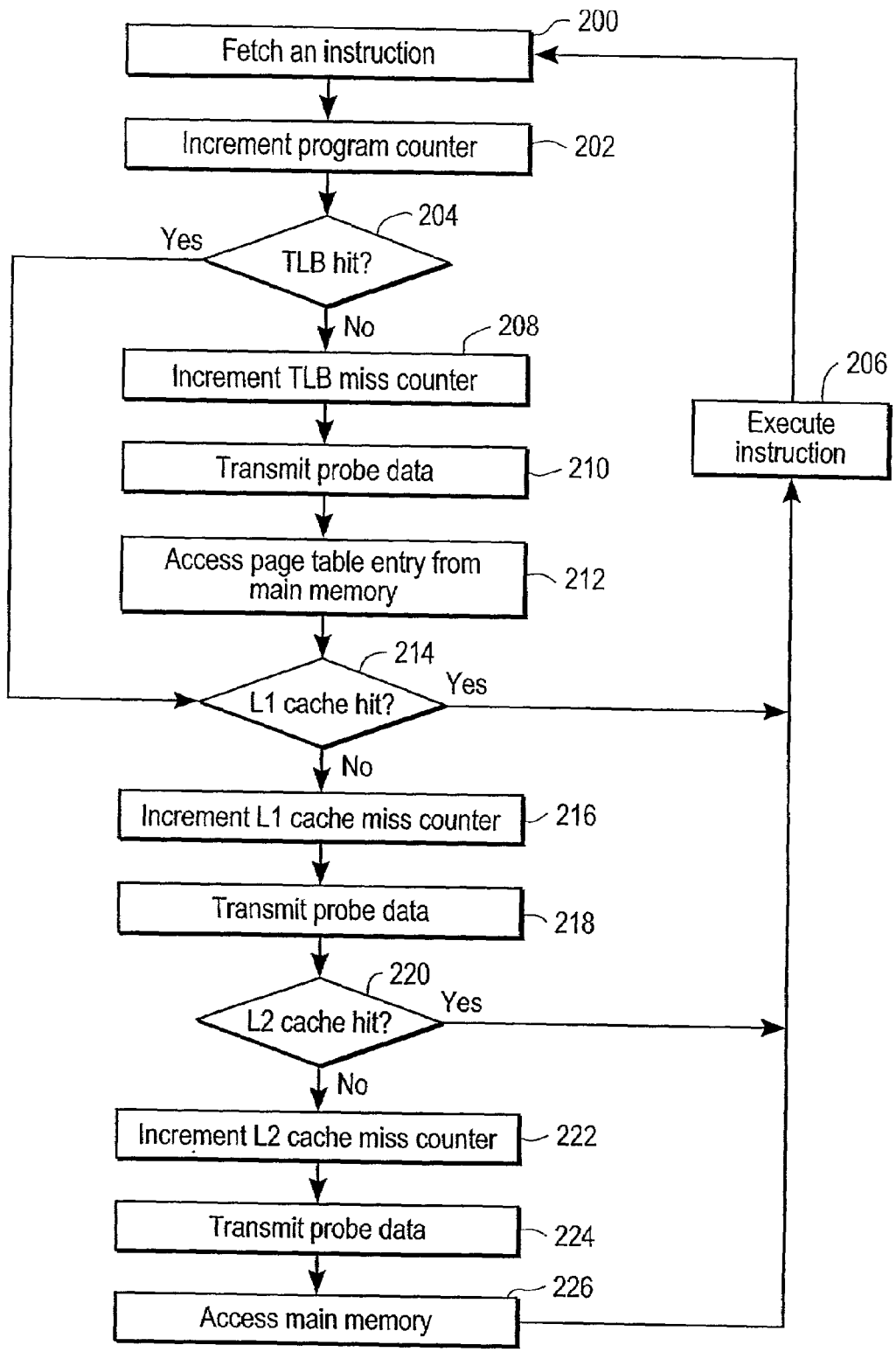
FIG. 4 is a flow chart illustrating the steps associated with an embodiment of the present invention.

FIG. 4 illustrates the steps used to monitor a program's execution behavior in the architecture shown in FIG. 3. The instruction issue unit 152 receives the instruction opcode (step 200) and increments the program counter 154 (step 202). The program counter signal 134 represents the value of the program counter 154. The address of the instruction is transmitted to the TLB 156. A TLB hit occurs when the address is found in the TLB 156. In this case (step 204-Y), the physical address is used to access the L1 cache 158. When there is no TLB hit (step 204-N), the TLB miss signal 172 is applied to the TLB miss counter 160 which is then incremented (step 208). The probe data is then transmitted to the performance monitor circuit 112 (step 210). The first 168 and second 164 multiplexers and the decoder 166 receive the miss 172 and identifier 170 signals and generate the miss identifier signal 136 and the miss count signal 138 (step 210). These signals 136, 138 and the program counter signal 134 are then transmitted to the performance monitor circuit 112 (step 210). The physical address that was not available in the TLB is then obtained from accessing the appropriate page table entry from the first memory 106 (step 212).

Once the physical address is obtained, the L1 cache 158 is accessed. If the physical address is located in the L1 cache 158 (step 214-Y), then there is a L1 cache hit, the instruction is executed (step 206), and processing continues with the next instruction (step 200). Otherwise, the L1 cache miss signal 178 is applied to the L1 cache counter 161 which is then incremented (step 216). The probe data is then transmitted to the performance monitor circuit 112 (step 218). The first and second multiplexers 164, 168 and the decoder 166 receive the miss and identifier signals and generate a miss identifier signal 136 that represents the L1 cache 158 and the miss count signal 138 that contains the current value in the L1 miss cache counter 161 (step 218). These signals 136, 138 and the program counter signal 134 are then transmitted to the performance monitor circuit 112 (step 218).

If the address is not found in the L1 cache 158, the L2 cache 104 is then accessed. If the physical address is located in the L2 cache 104 (step 220-Y), then the instruction is executed (step 206) and processing continues with the next instruction (step 200). Otherwise, the L2 cache miss signal 186 is applied to the L2 cache counter 162 thereby incrementing the counter 162 (step 222). The probe data is then transmitted to the performance monitor circuit 112 (step 224). The first and second multiplexers 164, 168 and the decoder 166 receive the miss and identifier signals and generate a miss identifier signal 136 that represents the L2 cache 104 and the miss count signal 138 that contains the current value in the L2 miss cache counter 162 (step 224). These signals 136, 138 and the program counter signal 134 is then transmitted to the performance monitor circuit 112 (step 224). The first memory 106 is then accessed (step 226), the instruction is executed (step 206), and processing continues with the next instruction (step 200).

The foregoing description has described the method and operation of the present technology. This technology is advantageous for monitoring the performance of a program since it utilizes hardware logic thereby not impacting or intruding the program code. In addition, the probe signals can be used to associate the probe data with a corresponding source code statement thereby enabling the user to optimize the source code in a more efficient manner.

In an alternate embodiment, the probe data can be filtered. The filter can be implemented in hardware by a separate filter logic circuit that is connected to the second bus. The filter logic circuit can monitor the time stamp signal between successive probe data signals. Signals can be filtered based on the difference in the time stamp signals in order to obtain a normally distributed set of probes. The present invention anticipates the use of a filter mechanism since the probe data includes an accumulative count of the number of misses for a particular device. This count is needed since the filter mechanism eliminates some of the probes. Without the accumulative count there is no way of obtaining an accurate count of the misses for a particular device. In another embodiment, the probe data can be filtered by a software procedure that executes in the microprocessor. The software filter procedure can filter the signals using any particular filter or statistical sampling technique. In another alternate embodiment, the filter mechanism can be based in hardware. Referring to FIG. 1, a filter logic unit can be coupled to the probe logic unit 108 and the bus 120. The filter logic unit can receive the probe data and statistically sample the data. The filter logic unit can then send selected probe data to the second memory 110 for storage. In this manner, the amount of probe data is reduced to a normally distributed set which can then be efficiently analyzed The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The present invention is not constrained to verifying the computer system shown in FIGS. 1 and 2. One skilled in the art can easily modify the invention to verify other microprocessor architectures, integrated circuit designs, other types of electronic devices, and the like.

The invention claimed is:

1. A method for monitoring an execution of a program, the method comprising the steps of:
   (1) obtaining a first indication including a first address;
   (2) searching a first memory device for an entry associated with the first address;
   (3) when the entry in the first memory device does not exist, generating at least one probe signal indicating a miss entry in the first memory device;
   (4) generating a temporal identifier signal that is associated with the probe signals; and
   (5) storing the temporal identifier signal and the probe signals in memory.

2. The method of claim 1,
   step (1) including the step of incrementing a program counter with the first instruction; and
   step (3) including the step of generating a second probe signal indicating a content of the program counter.

3. The method of claim 1,
   before step (5),
      searching a second memory device for an entry associated with the first address,
      when the entry in the second memory device does not exist, generating at least one probe signal indicating a miss entry in the second memory device, and
      generating a temporal identifier signal that is associated with the probe signal.

4. The method of claim 1,
before step (2),
    searching an address storage device for an entry associated with the first address,
    when the entry in the address storage device does not exist, generating at least one probe signal indicating a miss entry in the address storage memory device, and
    generating a temporal identifier signal that is associated with the probe signal.

5. A method for monitoring an execution behavior of a program, comprising:
    generating probe signals representative of memory access misses occurring in a processor;
    receiving the probe signals and associating a temporal identifier signal with the probe signals; and
    storing the temporal identifier signal and the probe signals; and
    generating a second high-speed memory miss signal, a second high-speed memory miss count signal and a time stamp signal, the second high-speed memory miss signal indicating a miss in a second high-speed memory, the second high-speed memory miss count signal representing a number of misses in the second high-speed memory, and the time stamp signal indicating when the second high-speed memory miss signal is active.

6. The method of claim 5, further comprising:
    generating probe signals in response to a memory access miss signal when executing a specified instruction.

7. The method of claim 5, further comprising:
    generating probe signals recording a TLB miss when executing a specified instruction.

8. The method of claim 5, further comprising
    generating a program counter signal, a TLB identification signal indicating a miss in the TLB, a TLB miss count signal representing an accumulative count of TLB misses, and a time stamp signal when the TLB miss signal is activated.

9. The method of claim 8, further comprising
    incrementing a TLB miss counter when the TLB miss signal is activated.

10. The method of claim 5, wherein
    The program executes on a processor;
    the processor includes a first high-speed memory and a program counter, the first high-speed memory generating a first high-speed memory miss signal; and
    a probe logic unit generates a program counter signal, a first high-speed memory miss signal indicating a miss in the first high-speed memory, a first high-speed memory miss count signal representing a number of misses in the first high-speed memory, and a time stamp signal when the first high-speed memory miss signal is activated.

11. The method of claim 10, wherein
    the probe logic unit includes a first high-speed memory miss counter coupled to the first high-speed memory miss signal, the first high-speed memory miss counter is incremented when the first high-speed memory miss signal is activated.

* * * * *